United States Patent [19]

Schmitz

[11] 4,391,119
[45] Jul. 5, 1983

[54] APPARATUS FOR CUTTING SWIVEL-BENDING AND PRESS-BENDING SHEET METAL AND SIMILAR MATERIALS

[76] Inventor: Peter Schmitz, Pietra Rossa-Renon, Prov. Bozen, Italy

[21] Appl. No.: 234,415

[22] Filed: Feb. 13, 1981

[30] Foreign Application Priority Data

Feb. 20, 1980 [IT] Italy .................... 4810 A/80

[51] Int. Cl.³ .................................. B21D 5/01
[52] U.S. Cl. .......................... 72/384; 72/319; 72/324; 72/389
[58] Field of Search ............... 72/384, 324, 319, 389, 72/386, 332, 326, 337, 429, 404, 453.18, 455; 83/513, 518, 694

[56] References Cited

U.S. PATENT DOCUMENTS

| | | | |
|---|---|---|---|
| 1,259,801 | 3/1918 | Stich | 83/518 |
| 1,333,201 | 3/1920 | Beatty | 83/518 |
| 1,389,880 | 9/1921 | Kraut | 83/518 |
| 3,007,508 | 11/1961 | Giordano | 72/386 |
| 3,668,919 | 6/1972 | Hongo | 72/324 |
| 3,701,276 | 10/1972 | Malmgrer | 72/324 |
| 3,724,256 | 4/1973 | Kroetch | 72/389 |
| 3,726,120 | 4/1973 | Hugert | 72/319 |
| 3,866,522 | 2/1975 | Oswalt | 72/332 |

FOREIGN PATENT DOCUMENTS

647503 5/1964 France ..................... 72/380

*Primary Examiner*—Gene Crosby
*Attorney, Agent, or Firm*—Daley & Brandt

[57] ABSTRACT

Apparatus for cutting, swivel-bending and press-bending of sheet material includes a frame having a cross-beam, a member providing a bearing surface, and a clamping beam, the cross-beam having a snaker and the clamping beam having a bending die for press-bending. The frame supports the cross-beam and the clamping beam for movement relative to one another whereby the snaker and die may engage the sheet material to effect press-bending. The frame further supports the clamping beam and bearing surface for movement relative to one another to clamp the sheet material to effect cutting or swivel-bending thereof. A swivel beam and shearing beam are supported by the frame for movement relative to the clamped sheet material independently of movement of the clamping beam.

6 Claims, 2 Drawing Figures

APPARATUS FOR CUTTING SWIVEL-BENDING AND PRESS-BENDING SHEET METAL AND SIMILAR MATERIALS

FIELD OF INVENTION

This invention relates to apparatus for cutting, swivel-bending and press-bending sheet metal and similar materials.

BACKGROUND OF INVENTION

Plate-working apparatus are known which represent a combination of a swivel-bending machine and plate shears, where the clamping beam is so arranged that it can be used for both working operations.

Since the bending angle of a swivel-bending machine is narrowly limited and does not permit, for example, bending in different directions on the same sheet panel, a press-bending machine is used as a rule in plate-working plants which permit a great number of working phases by using different interchangeable bottom- and top dies.

In artison shops and in the small industry where the working phases must frequently be changed, due to the smaller series production, the costs for special machines are unaffordable, and there is a lack of space in the halls, a multipurpose machine can frequently solve several problems of different kinds.

SUMMARY OF THE INVENTION

The object of the invention is to provide an apparatus for plate-working, which permits not only swivel-bending and cutting, but also press-bending; the apparatus according to the invention should have about the outside dimensions of a machine for one type of working, in addition the costs should be below the amount necessary for buying corresponding appropriate machines.

This problem is solved in this way that the clamping beam on the top side in an apparatus for swivel-bending and cutting sheet metal serves as a pressure element for press-bending, the crossbeam of the machine frame serving as a counterpart. The snaker is arranged on the top side of the clamping beam, and the bending die on the stationary crossbeam.

According to the invention, the clamping beam passes through the side parts of the frame so that it can be operated vertically by hydraulic cylinders; preferably one or more hydraulic cylinders in the center range of the clamping beam, can enhance the upward pressure through the bearing surface for swivel-bending and cutting.

According to another feature of the invention, hydraulic or mechanical tensioning elements can also be provided in the center range of the stationary crossbeam, which ensure a uniform bending radius over the entire bending length.

The apparatus according to the invention does not exclude the lateral attachment on the same frame of a pipe bending machine, forming steel shears, a punch, notching machine, etc., and the clamping beam can serve in press-bending as a stationary snakes support, while the crossbeam arranged above carries the upper die and is movable.

The invention will be described more fully on the basis of the attached drawing, which shows an embodiment according to the invention.

DESCRIPTION OF THE PREFERRED EMBODIMENT

Figure 1:
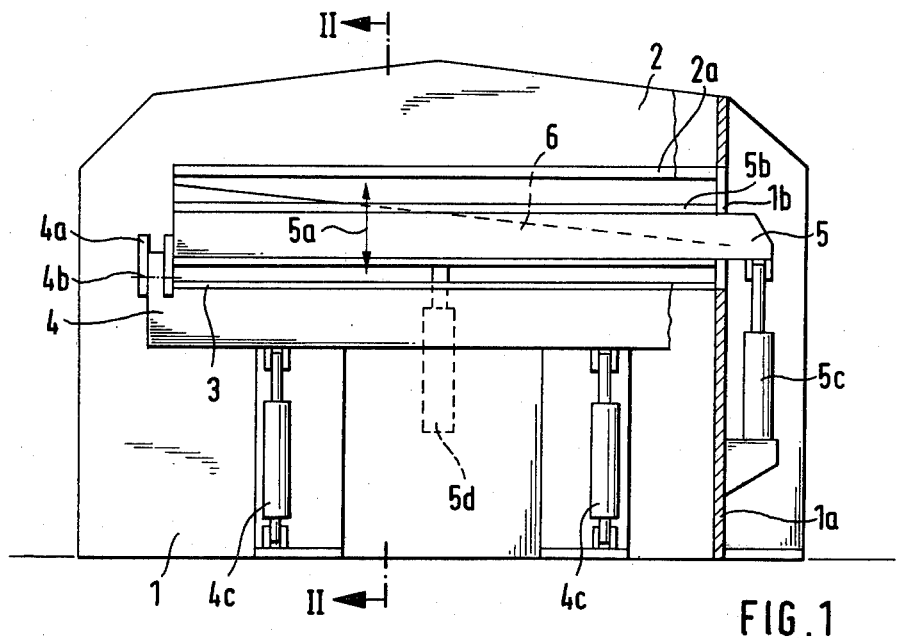
FIG. 1 shows a front view, partly in a section, of an apparatus according to the invention for swivel bending, cutting and press-bending beams.
Figure 2:
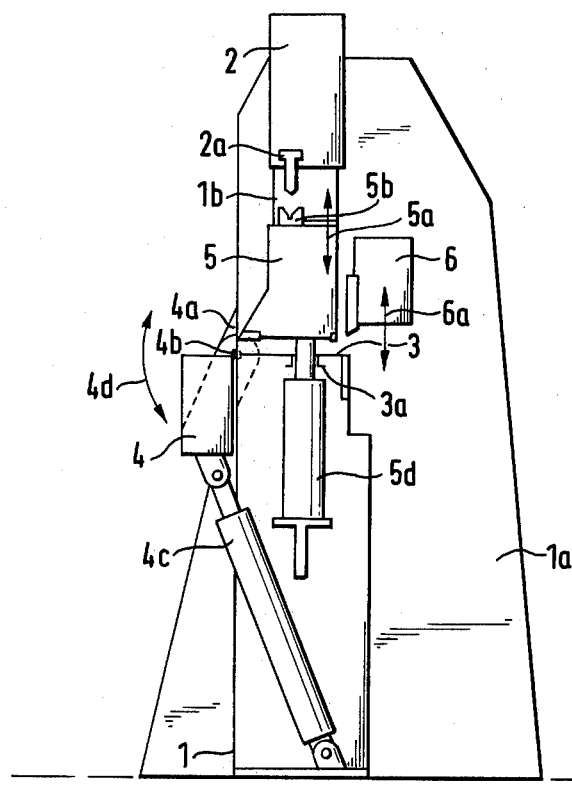
FIG. 2 shows a cross section of the apparatus represented in FIG. 1 along line II—II.

Frame 1 has two vertical side plates 1a, a bearing surface 3, and a stationary crossbeam 2.

On side plates 1a is arranged for movement as shown at 4d a swivel beam 4 over hinges 4a with bolts 4b. The swivel movement is achieved by two hydraulic cylinders 4c. Directly behind swivel beam 4 is arranged a clamping beam 5 which passes laterally by means of recesses 1b through side plates 1a, and which is operated vertically as shown at 5a by hydraulic cylinders 5c. Behind clamping beam 5 is arranged a shearing beam 6 which can effect shearing movement as shown at 6a, such shearing movement being independent of movement of clamping beam 5. Clamping beam 5 is an integral assembly, i.e., all components thereof are fixedly disposed relative to one another.

Clamping beam 5 serves to clamp the plate on bearing surface 3, either during the swivel-bending or during the cutting of the plate.

The top side of clamping beam 5 is so designed that it can be equipped with various snakers 5b, while the stationary crossbeam 2 permits the attachment of corresponding bending dies 2a. In order to increase the upward pressure of the clamping beam and to distribute it over its length, a hydraulic cylinder 5d is provided underneath bearing surface 3 which presses from the bottom against clamping beam 5 by means of a passage 3a. Stationary crossbeam 2 can have according to the invention hydraulic or mechanical tensioning elements which compensate any deformation upward or permit constant bending radii.

I claim:

1. Apparatus for cutting, swivel-bending and press-bending of sheet material, comprising: a frame for receiving said sheet material; a cross-beam having a first press-bending element; an integral clamping beam having a second press-bending element; means providing a bearing surface, said frame supporting said cross-beam and said clamping beam for movement relative to one another to effect engagement of said first and second press-bending elements with said sheet materials for press-bending thereof, said frame further supporting said clamping beam and such bearing surface means for movement relative to one another to clamp said sheet material for cutting and swivel-bending thereof, and a shearing beam supported by said frame for movement independently of movement of said clamping beam.

2. The apparatus claimed in claim 1 wherein said frame fixedly supports said cross-beam and wherein said frame includes opposed side plates defining respective recesses therein for movement of said clamping beam in said frame.

3. The apparatus claimed in claim 2 wherein said frame supports said cross-beam vertically above said clamping beam and wherein said frame supports said bearing surface means vertically below said clamping beam.

4. The apparatus claimed in claim 3 including first hydraulic cylinder means located outwardly of said bearing surface means for vertically operating said clamping beam.

5. The apparatus claimed in claim 4 including second hydraulic means extending through said bearing surface means for further vertically operating said clamping beam.

6. The apparatus claimed in claim 3 wherein said first press-bending element is a bending die and wherein said second press-bending element is a snaker.

* * * * *